(12) United States Patent
Pickholz

(10) Patent No.: US 8,845,128 B2
(45) Date of Patent: Sep. 30, 2014

(54) STRUCTURAL HEADLAMP ASSEMBLIES FOR VEHICULAR APPLICATIONS

(76) Inventor: Michael F. Pickholz, Oxford, MI (US)

(*) Notice: Subject to any disclaimer, the term of this patent is extended or adjusted under 35 U.S.C. 154(b) by 201 days.

(21) Appl. No.: 13/512,940

(22) PCT Filed: Dec. 2, 2010

(86) PCT No.: PCT/US2010/058792
§ 371 (c)(1),
(2), (4) Date: Nov. 28, 2012

(87) PCT Pub. No.: WO2011/069012
PCT Pub. Date: Jun. 9, 2011

(65) Prior Publication Data
US 2013/0070471 A1    Mar. 21, 2013

Related U.S. Application Data

(60) Provisional application No. 61/283,307, filed on Dec. 2, 2009.

(51) Int. Cl.
*F21V 29/00*    (2006.01)
*F21V 5/04*    (2006.01)

(52) U.S. Cl.
USPC ........... 362/235; 362/487; 362/373; 362/294; 362/547

(58) Field of Classification Search
None
See application file for complete search history.

(56) References Cited

U.S. PATENT DOCUMENTS

| | | |
|---|---|---|
| 5,633,629 A | 5/1997 | Hochstein |
| 5,782,555 A | 7/1998 | Hochstein |
| 5,783,909 A | 7/1998 | Hochstein |
| 5,784,006 A | 7/1998 | Hochstein |
| 5,785,418 A | 7/1998 | Hochstein |
| 5,857,767 A | 1/1999 | Hochstein |
| 6,045,240 A | 4/2000 | Hochstein |
| 6,257,749 B1 | 7/2001 | Ward |
| 6,428,189 B1 | 8/2002 | Hochstein |
| 6,443,592 B1 | 9/2002 | Unger |
| 6,517,218 B2 | 2/2003 | Hochstein |
| 6,582,100 B1 | 6/2003 | Hochstein |
| 7,427,152 B2 | 9/2008 | Erion |

(Continued)

FOREIGN PATENT DOCUMENTS

| | | |
|---|---|---|
| AU | 2008100403 | 6/2008 |
| EP | 1361144 A2 | 11/2003 |

OTHER PUBLICATIONS

International Magnesium Association, "Planes, Trains and Motorcycles . . . Magnesium Accelerates Smart Weighting Trend", Mg Showcase, Apr. 2009, pp. 1-4, Issue 8.

(Continued)

*Primary Examiner* — Ashok Patel
(74) *Attorney, Agent, or Firm* — Dickinson Wright PLLC

(57) ABSTRACT

A vehicle headlamp assembly, comprising a lens, a lamp housing cooperating with the lens to at least partially define a lamp chamber that is generally fluidly isolated from an ambient atmosphere outside the lamp chamber, and at least one lamp provided in the lamp chamber. The lamp housing includes at least one structural member adapted to connect to and bear structural loads applied by one or more adjacent components of a vehicle in which the vehicle headlamp assembly is installed. The assembly may further comprise at least one vehicle component connected to the lamp housing, whereby the lamp housing is capable of bearing structural loads applied by the at least one component.

31 Claims, 11 Drawing Sheets

(56) References Cited

U.S. PATENT DOCUMENTS

| | | |
|---|---|---|
| 7,824,076 B2 | 11/2010 | Koester |
| 7,896,512 B2 * | 3/2011 | Tatara et al. ............ 362/43 |
| 8,109,660 B2 | 2/2012 | Hochstein |
| 2001/0046139 A1 | 11/2001 | Hashigaya |
| 2002/0015310 A1 | 2/2002 | Pickholz |
| 2005/0190572 A1 | 9/2005 | Komatsu |
| 2007/0047229 A1 | 3/2007 | Lee |
| 2007/0058387 A1 | 3/2007 | Takada |
| 2007/0076413 A1 | 4/2007 | Mingozzi |
| 2007/0115656 A1 | 5/2007 | Chou |
| 2007/0127252 A1 | 6/2007 | Fallahi |
| 2008/0123334 A1 | 5/2008 | Hochstein |
| 2008/0175003 A1 | 7/2008 | Tsou |
| 2009/0003009 A1 | 1/2009 | Tessnow |
| 2009/0154190 A1 * | 6/2009 | Choi et al. ............ 362/549 |
| 2009/0223047 A1 | 9/2009 | Hochstein |
| 2009/0231876 A1 * | 9/2009 | Nakamura et al. ............ 362/545 |
| 2010/0020548 A1 | 1/2010 | Tyson |
| 2011/0038170 A1 * | 2/2011 | Kracker et al. ............ 362/487 |
| 2011/0053492 A1 | 3/2011 | Hochstein |
| 2011/0110087 A1 | 5/2011 | Hochstein |
| 2011/0114976 A1 | 5/2011 | Hochstein |
| 2011/0122616 A1 | 5/2011 | Hochstein |
| 2011/0140140 A1 | 6/2011 | Hochstein |
| 2011/0273879 A1 | 11/2011 | Hochstein |
| 2012/0069571 A1 | 3/2012 | Hochstein |
| 2012/0147603 A1 | 6/2012 | Hochstein |
| 2013/0314937 A1 * | 11/2013 | Takahashi et al. ............ 362/538 |

OTHER PUBLICATIONS

"SureFire Maximus 500 Lumens Rechargeable LED Head Light," http://www.opticsplanet.com/surefire-maximus-500-lumens-re-chargeable-led-head-light-bl, retrieved from Internet Jul. 10, 2013.

International Search Report for PCT/US2010/058792, dated Jul. 28, 2011.

\* cited by examiner

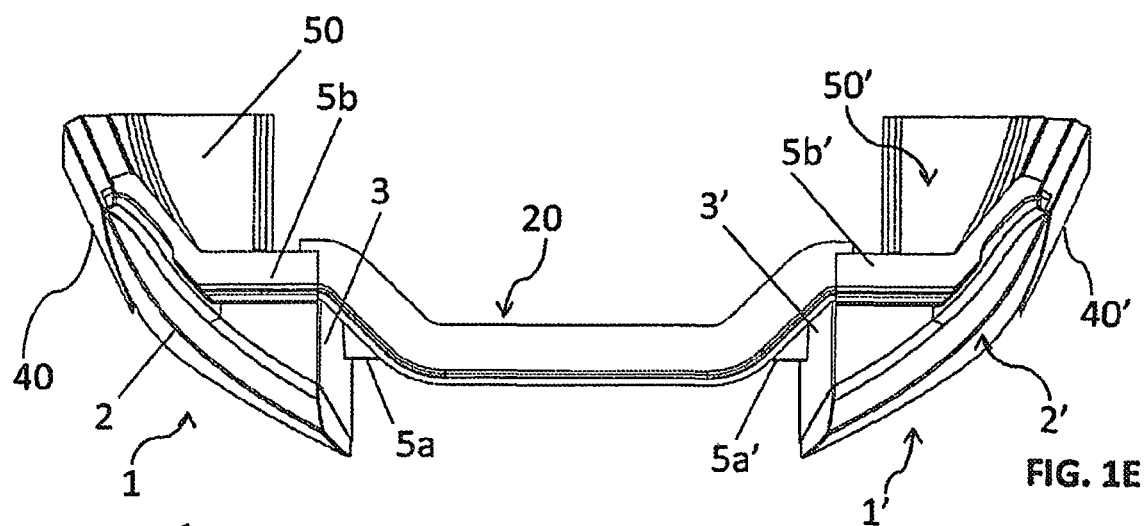
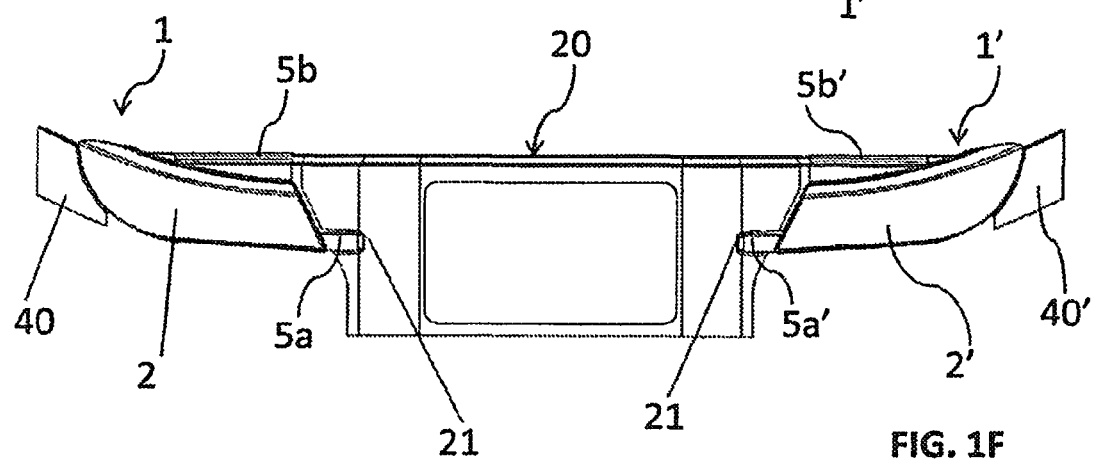

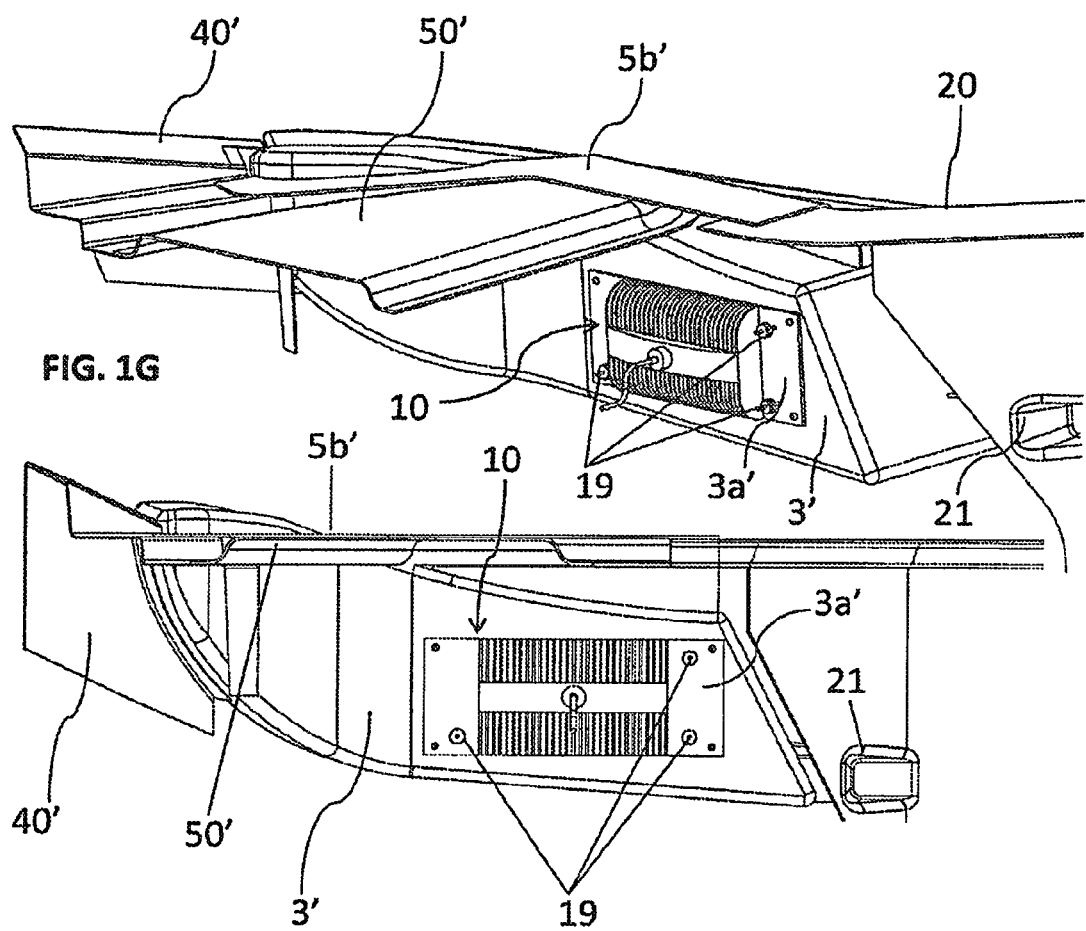

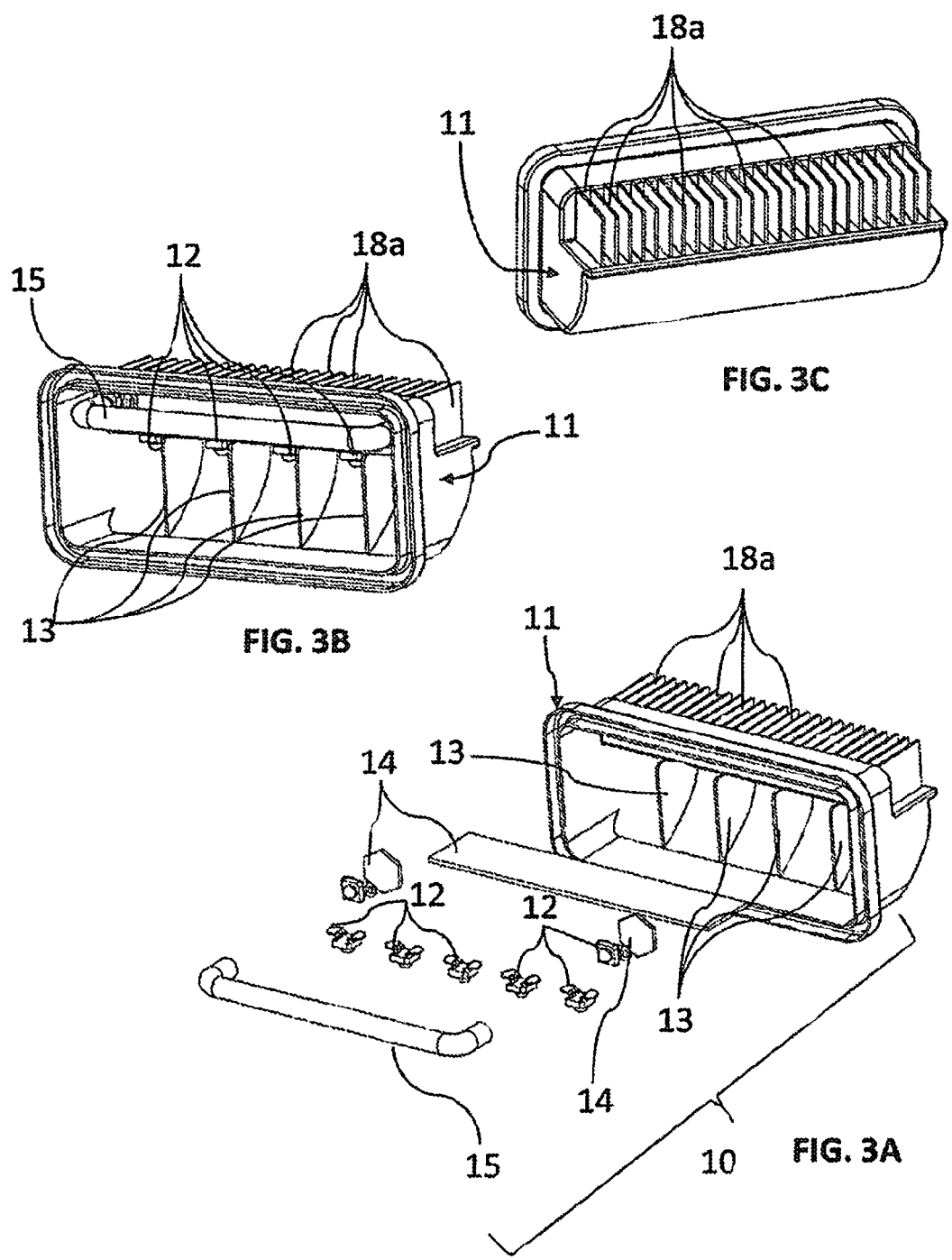

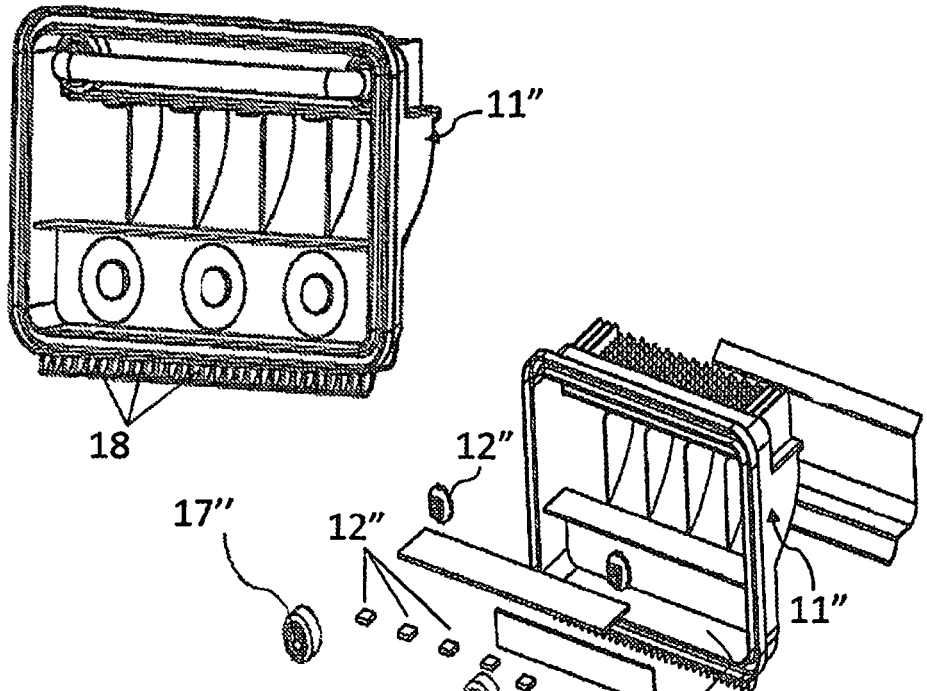
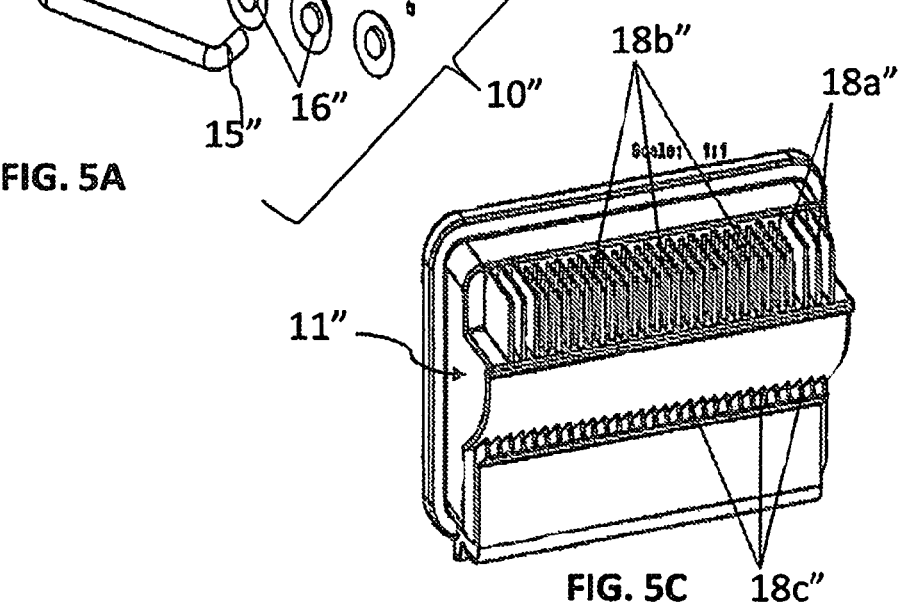

STRUCTURAL HEADLAMP ASSEMBLIES FOR VEHICULAR APPLICATIONS

CROSS-REFERENCE TO RELATED APPLICATIONS

This application is related to, and claims the benefit of priority from, U.S. Provisional Application Ser. No. 61/283,307, filed 2 Dec. 2009, the disclosure of which application is incorporated herein by reference in its entirety.

FIELD OF THE INVENTION

The present invention pertains to the field of vehicular headlamp assemblies, and more particularly to vehicular headlamp assemblies wherein a lamp housing thereof includes at least one structural member adapted to connect to and bear structural loads applied by one or more adjacent components of a vehicle in which the vehicle headlamp assembly is installed.

BACKGROUND OF THE INVENTION

Headlamp assemblies have, since the inception of the automobile and the adoption of lighting on bicycles and motorcycles, been ancillary devices designed to provide functional forward lighting as well as required lighted and non-lighted signaling and positioning functions, and fulfilling vehicular styling considerations.

At the dawn of the automotive age, carriage lamps were incorporated onto vehicle design. These were followed by electrically-powered lighting systems.

Irrespective of the type of illumination source and lamp construction methodology, headlamps have and remain ancillary elements mechanically attached to the vehicle architecture and usually primarily serving the lighting and illumination functions, with secondary considerations, such as environmental, safety, aerodynamic, and other functional considerations addressed where applicable.

During the late 1960's, primarily in Western Europe marketplace, automotive companies sought to incorporate more styling freedom onto headlamp design, thus shifting away from standardized lighting devices to vehicle-specific designs. To this point headlamps were generally external devices aimed and adjusted via external mechanical means.

The quest to better integrate the headlamp onto the vehicle's overall shape led to the development of headlamp designs having encapsulated reflector assemblies and internal adjustment devices. In so doing, the outer headlamp lens, now fixed in a specific position, could thus be better integrated onto the overall vehicle design with the aiming/adjustment function fitted within an overall headlamp enclosure.

While such design originally incorporated mainly metal construction, the quest for increased design and fitment flexibility led to the development of injection molded plastic headlamp housings. Modern headlamp designs essentially follow this practice with plastic headlamp housings, featuring lighting components packaged within, or attached to, the headlamp enclosure being the norm.

Contemporary styling, aerodynamic and safety regulatory requirements, along with newly developed technologies such as LED forward lighting, continue to increase the complexity, and oftentimes the size, of headlamps. As the headlamp size, positioning on the vehicle and overall geometry grows in complexity, the headlamp attachment support structure experiences a concomitant level of complexity, cost and weight impact.

Plastic materials, whether natural, alloyed or reinforced (e.g., fiber-reinforced plastic) do not usually exhibit the type of long term durability required to be used as structural components, and have thus proved impractical for such applications. Multi-material approaches, such as insert-molding of reinforced metal components, composite construction method and the like can alleviate such deficiencies, yet invariably drive up the cost of the items in question.

Another primary consideration regards the established design hierarchy within the automotive industry, whereby lighting components are designed as separate entities from the vehicle's primary structure. As such, lighting suppliers routinely have only limited involvement with vehicle structural considerations, save for safety and other functional considerations that directly affect a particular vehicular application.

Yet another consideration is the rapidly escalating cost of vehicle headlamp assemblies. The cost of such assemblies has been increasing so rapidly that a replacement pair of luxury vehicle headlamp replacement fixtures can now cost more than the purchase of a new economy automobile. Consequently, the reparability and reusability of components has become an important design consideration.

United States Published Patent Application No. US 2002/0015310, published Feb. 7, 2002, discloses a vehicle's front-end structural support featuring integral headlamps. The integration of the headlamp housing onto the front-end structural support (front-end module) provides a substantive reduction in the overall volume and cost, and yielded increased usable space within the front/engine compartment of the vehicle. The headlamps are integrated onto a single molding encompassing an overall structural component. Yet, the headlamp housings themselves are not structural in nature. Instead, they are simply integrated onto a metal/plastic matrix structural element.

Thixoformed magnesium support bracket structures, which locate and support the headlamp, fairings, instrument cluster and mirror assemblies, are also known in the art for use with motorcycles, for example, the Buell Motorcycle Company.

A still further complicating factor of modern headlamp applications is the increasing use of LED lighting. LEDs, unlike more conventional light sources such as tungsten, halogen or HID light sources, emit essentially no infrared radiation and are, therefore, "cold" on their optical output side. Nevertheless, LEDs do generate heat at their electrical junction, the so-called "back side," of the LED proper. This is particularly significant as the drive current increases in order to achieve greater LED optical output. Control of this thermal output, referred to as "junction temperature," is critical so as to ensure proper operating performance of the LED and avoid either premature degradation or failure.

With the "back side" of the LEDs being housed within the lamp housing, which housing is conventionally made primarily of plastic, the heat generated is "trapped" within the housing. This thermal output on the "back side" of LEDs must be removed in order to prevent overheating and, relatedly, premature failure of the LED lamp. Accordingly, LEDs do require cooling via the introduction of heat sinks.

Conventionally, it is the practice to place such heat sinks within the housing of the LED lamp, where the LEDs themselves are housed. For instance, the head and tail-lamps for the CADILLAC CTS brand automobile utilize a single, high-power LED and a die-cast heat sink that dissipates heat within the housing of the lamp. Given that there is, for these particular applications, a sufficient amount of interior volume in which to dissipate this energy, such heat sinks serve their purpose. However, either for smaller volumes or applications generating additional thermal output, adequate dissipation of heat internally is complicated, thereby forcing the adoption of more elaborate thermal management solutions, such as exposing the heat sink to the outside of the housing or utilizing "heat pipes" (liquid filled thermal conductors) or cooling fans to circulate air within the lamp housing.

Still another solution, disclosed in United States Patent Application Pub. No. US 2007/0127252 A1 to Fallahi et al., published Jun. 7, 2007, comprises an LED headlamp assembly for a motor vehicle having a plastic lens and a plastic lamp housing cooperating with the lens to define an inner chamber that is generally fluidly isolated from the atmosphere. An injection molded metal reflector is mounted to the lamp housing and has a polished reflective portion that reflects light forward through the lens. A separate heat sink portion of the reflector includes fins that extend through the lamp housing and are exposed to the atmosphere outside the lamp housing, such that heat from the inner chamber is transmitted from the fins to the atmosphere.

The foregoing thermal management solutions notwithstanding, it is desirable to have a lamp assembly, for automotive as well as other applications, that is able to effectively dissipate heat energy generated by LEDs or other light sources.

SUMMARY OF THE DISCLOSURE

The present invention comprehends a vehicle headlamp assembly, comprising a lens, a lamp housing cooperating with the lens to at least partially define a lamp chamber that is generally fluidly isolated from an ambient atmosphere outside the lamp chamber, and at least one lamp provided in the lamp chamber. The lamp housing includes at least one structural member adapted to connect to and bear structural loads applied by one or more adjacent components of a vehicle in which the vehicle headlamp assembly is installed.

Per one feature, the lamp housing is adapted to connect to and bear structural loads applied by one or more vehicle components selected from the group consisting of an inner fender support, a radiator support/module, a vehicle structural member, a fender, a shield, a battery box, an electronic control module, and a reinforcing structure.

According to one embodiment, the lamp housing may define a heat sink exposed to the ambient atmosphere outside the lamp chamber such that heat from the at least one lamp is transmitted to the ambient atmosphere. The heat sink defined by the lamp housing may include radiating elements that are exposed to the ambient atmosphere outside the lamp chamber such that heat from the lamp is transmitted to the ambient atmosphere through the radiating elements. The radiating elements may comprise fins that are exposed to the ambient atmosphere outside the lamp chamber such that heat from the lamp is transmitted to the ambient atmosphere by the fins. The radiating elements may also comprise pins that are exposed to the ambient atmosphere outside the lamp chamber such that heat from the lamp is transmitted to the ambient atmosphere by the pins.

Per another feature, the heat sink defined by the lamp housing may include one or more ducts configured to promote passive convective cooling. The one or more ducts may be defined in a separate baffle that is secured to the lamp housing.

Per one feature of the invention, the at least one lamp may comprise one or more LEDs.

Per another feature thereof, the lamp housing may be formed, including by thixoforming, injection molding, etc., as a single, unitary metal piece.

The lamp housing may be formed from one or more materials selected from the group consisting of stainless steel, low alloy steel, tool steel, titanium, cobalt, copper, magnetic metal, hardmetal, refractory metal, ceramic, magnesium, aluminum, and magnesium/aluminum alloy.

According to still another feature of the present invention, the at least one lens is carried on a separate lighting subassembly that is removably mountable to the lamp housing in sealed relation therewith.

In one embodiment, the at least one structural member of the lamp housing is at least one motorcycle instrument cluster support structure, as well as capable to support an aerodynamic fairing as well as rear view mirrors. The lamp housing, including the at least one motorcycle fairing support structure, may, in one form of the invention, be formed as a single, unitary metal piece or, alternatively, may comprise a unitary assembly of multiple constituent elements The present invention further comprehends a vehicle headlamp and component assembly, comprising a lens, a lamp housing cooperating with the lens to at least partially define a lamp chamber that is generally fluidly isolated from an ambient atmosphere outside the lamp chamber, at least one lamp provided in the lamp chamber, and at least one vehicle component connected to the lamp housing whereby the lamp housing is capable of bearing structural loads applied by the at least one vehicle component. The at least one vehicle component may, for instance, comprise one of an inner fender support, a radiator support/module, a vehicle structural member, a fender, a shield, a battery box, an electronic control module, and a reinforcing structure.

BRIEF DESCRIPTION OF THE DRAWINGS

For a better understanding of the invention, and to show more clearly how it may be carried into effect according to one or more embodiments thereof, reference will now be made, by way of example, to the accompanying drawings, showing exemplary embodiments of the present invention and in which:

FIGS. 1E and 1F are, respectively, top and frontal plan views of the interconnected elements of the vehicle headlamp and component assembly of FIG. 1A;

FIGS. 1G and 1H are, respectively, partial rear perspective and partial rear plan views of the interconnected elements of the vehicle headlamp and component assembly of FIG. 1A;

FIG. 3A is an exploded perspective view of a lamp sub-assembly according to a first embodiment of the present invention;

FIGS. 3B and 3C are, respectively, frontal and rear perspective views of the lamp sub-assembly according to the embodiment of FIG. 3A;

FIG. 5A is an exploded perspective view of a lamp sub-assembly according to a third embodiment of the present invention; and FIGS. 5B and 5C are, respectively, frontal and rear perspective views of the lamp sub-assembly according to the embodiment of FIG. 5A.

DETAILED DESCRIPTION

As required, a detailed embodiment of the present invention is disclosed herein. However, it is to be understood that the disclosed embodiment is merely exemplary of the invention that may be embodied in various and alternative forms. Therefore, specific structural and functional details disclosed herein are not to be interpreted as limiting, but merely as a representative basis for teaching one skilled in the art to variously employ the present invention.

The accompanying drawings are not necessarily to scale, and some features may be exaggerated or minimized to show details of particular components.

Referring first to FIGS. 1A through 1H, the present invention in one exemplary embodiment is generally characterized as a vehicle headlamp assembly 1 comprising a lens 2, a lamp housing 3 cooperating with the lens to at least partially define a lamp chamber (not visible) interiorly thereof that is generally fluidly isolated from an ambient atmosphere outside the lamp chamber, and at least one lamp (not visible) provided in the lamp chamber. The lamp housing 3 includes one or more structural members 5a, 5b adapted to connect to and bear structural loads applied by one or more adjacent components of a vehicle in which the vehicle headlamp assembly is installed.

Without limitation, the one or more components adjacent the lamp housing 3 may be selected from the group consisting of an inner fender support, a radiator support/module (such as partially shown at 20 in FIGS. 1A, 1B, 1G and 1H, and fully shown in FIGS. 1C through 1F), a vehicle structural member (such as shown at 50 in FIGS. 1A through 1H), a fender (such as partially shown at 40 in FIGS. 1A through 1H), a shield, a battery box, an electronic control module, and/or a reinforcing structure. The headlamp assembly of the present invention can thus be incorporated onto a vehicle as a structural member and can, therefore, have other components (e.g., inner fender supports, radiator support/modules, vehicle structural members, fenders, shields, battery boxes, electronic control modules, reinforcing structure, etc.) attached to it, rather than the headlamp assembly simply being an ancillary, add-on device, as is conventional practice.

Figure 1A:
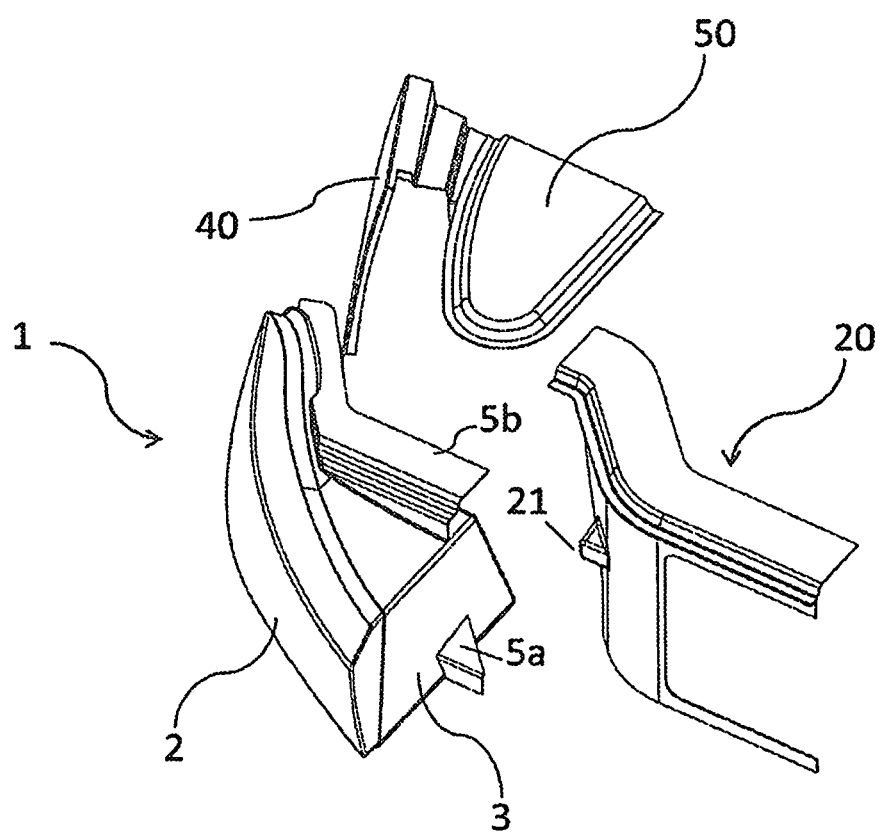
FIG. 1A is an exploded, partially cut-away perspective view of the vehicle headlamp and component assembly according to a first embodiment of the present invention, depicting each of the headlamp assembly and adjacent vehicular components to which the headlamp assembly is connectable.
Figure 1B:
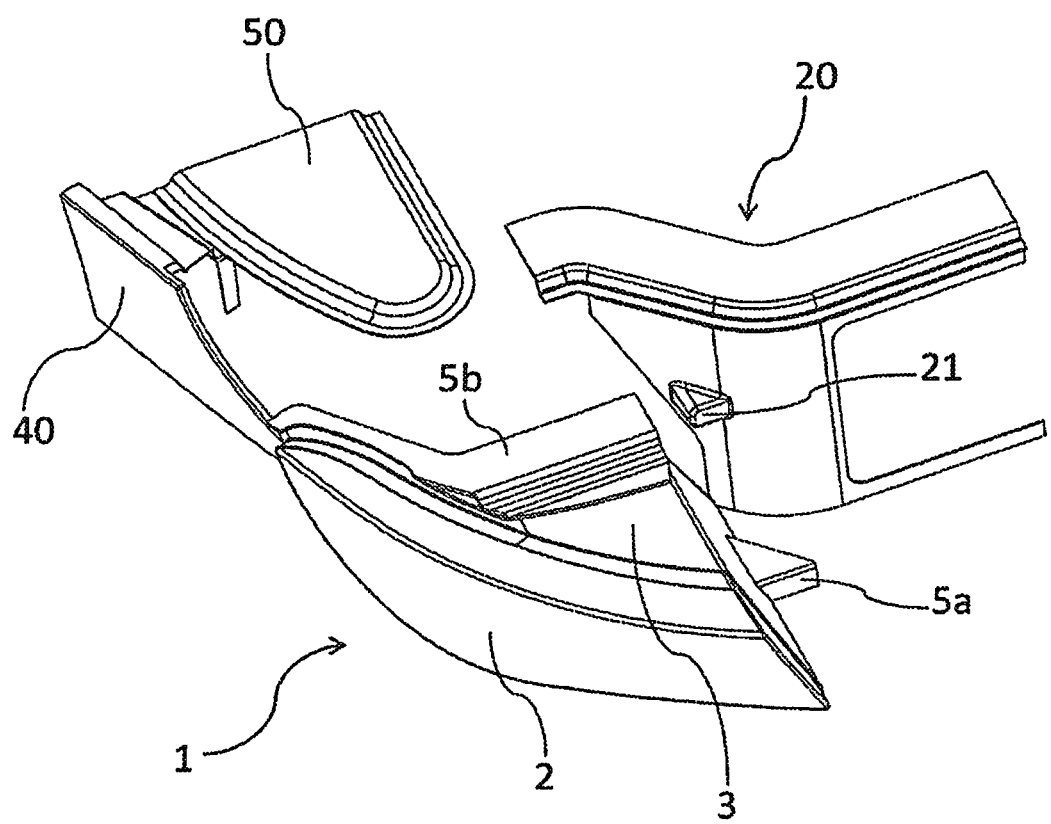
FIG. 1B is an exploded, partially cut-away perspective view of the vehicle headlamp and component assembly of FIG. 1A, taken from a different quarter.
Figure 1C:
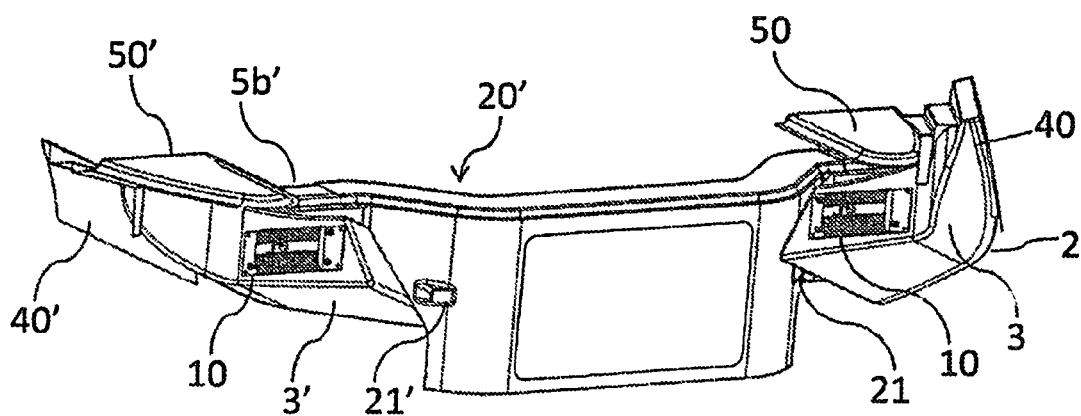
FIGS. 1C and 1D are, respectively, rear and frontal perspective views of the interconnected elements of the vehicle headlamp and component assembly of FIG. 1A.
Figure 1D:
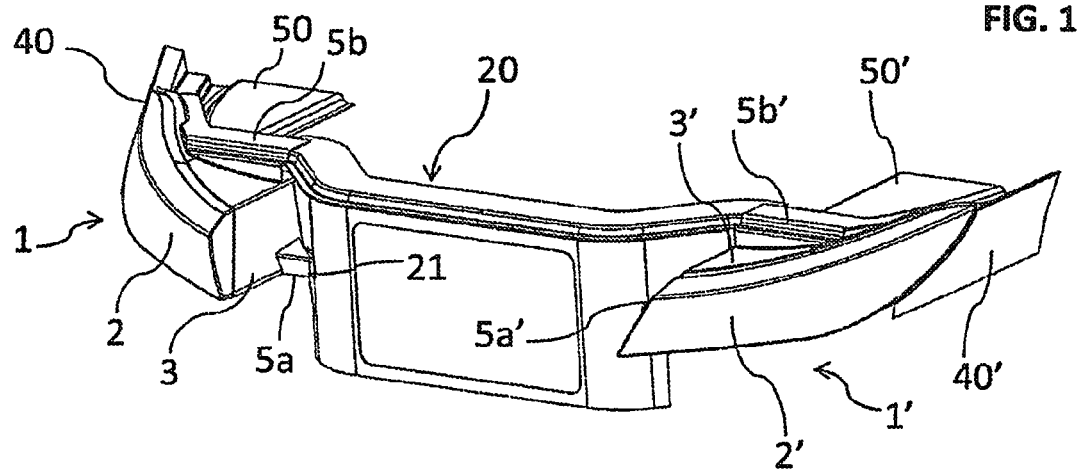

More particularly, and with continued reference to FIGS. 1A and 1H, it will be seen that, per the exemplary embodiment of these drawings, the structural members 5a, 5b (two are provided in the exemplary embodiment) comprise, respectively, a bracket and shelf, as shown. Bracket 5a is adapted to be received over a correspondingly-shaped and dimensioned tab/protrusion 21 extending from an adjacent radiator support/cross-member component 20, while shelf 5b is dimensioned to inter-relate with an adjacent fender 40 and longitudinal structural member 50, also known and referred to as a "shotgun rail," all as best shown in FIGS. 1C through 1H.

Still referring to the embodiment of FIGS. 1A and 1H, shelf 5b support structure, fender 40 and longitudinal structural member 50 inter-relate as follows: Fender 40 is connected to each of longitudinal structural member 50 and a portion of shelf 5b, in each instance via conventional means, such as, by way of non-limiting example, bolts and/or screws and locating pins, adhesives, etc. Longitudinal structural member 50 is likewise connected to a portion of shelf 5b, also via conventional means, such as, by way of non-limiting example, bolts and/or screws and locating pins, adhesives, etc. In this manner, headlamp assembly provides structural support for each of the fender and longitudinal structural member.

Instead of direct connection to structural member 50, fender 40 may alternatively be indirectly connected thereto via connection with structures extending from the longitudinal structural member 50, such as inner engine-compartment closure panels, for instance.

Interconnection of fender 40 to longitudinal structural member 50 or structures extending therefrom is consistent with conventional practice. However, it is usual in conventional practice to further support fender 40 via one or more separate support brackets that extend from the vehicle structure. The use of such separate support brackets introduce tolerance stack-up, thereby affecting the fit and finish of the vehicle. By providing on the inventive headlamp assembly 1 one or more structural members such as shelf 5b for connecting to and bear at structural loads applied by the fender 40, it will be appreciated that conventional support brackets may be eliminated, thus improving the overall fit and finish of the vehicle, while still providing for structural interrelationship between the various components (i.e., headlamp assembly, fender, longitudinal structural member).

Of course, it is contemplated that the particular form and number of the structural members is variable depending upon the particular application in which the present invention is employed, subject only to the limitation that the headlamp assembly include at least one such structural member that is adapted to connect and bear structural loads applied by at least one adjacent vehicle component.

The inventive headlamp assembly 1 may, depending on the particular application, be employed singly or, as shown in FIGS. 1A through 1F, multiply. For instance, the embodiment of FIGS. 1A through 1F shows two headlamp assemblies 1 and 1', each a "mirror-image" of the other and each configured to be connected, in the manner heretofore described, by structural members 5a, 5a' to at least opposite sides of one or more vehicle components such as the illustrated radiator support/module 20, as well as to fenders 40, 40' and longitudinal supports 50, 50' via structural members 5b, 5b'.

Distinct from the approach disclosed in the prior art, e.g., in Published US Application No. 2002/0015310, it will be appreciated from the foregoing that the current innovation retains the individual nature of any given headlamp that is to be attached to other structural components (e.g., radiator support, cross-members, frame rails, etc.) so as to form an overall vehicular structural assembly that includes a headlamp assembly. In other words, the vehicle structural assembly may comprise one or more automotive vehicle components as well as a headlamp assembly. The headlamp assembly may comprise a structural lamp housing member that may be adapted to connect to and bear structural loads applied by the one or more adjacent vehicle components such as an inner fender support, a radiator support/module, a vehicle structural member, a fender, a shield, a battery box, an electronic control module, and/or a reinforcing structure.

The structural headlamp approach described above is not limited to automotive applications, and may optionally be applied to any type of wheeled vehicle employing lighting assemblies, including, without limitation, motorcycles, motor-scooters, and the like.

Figure 2A:
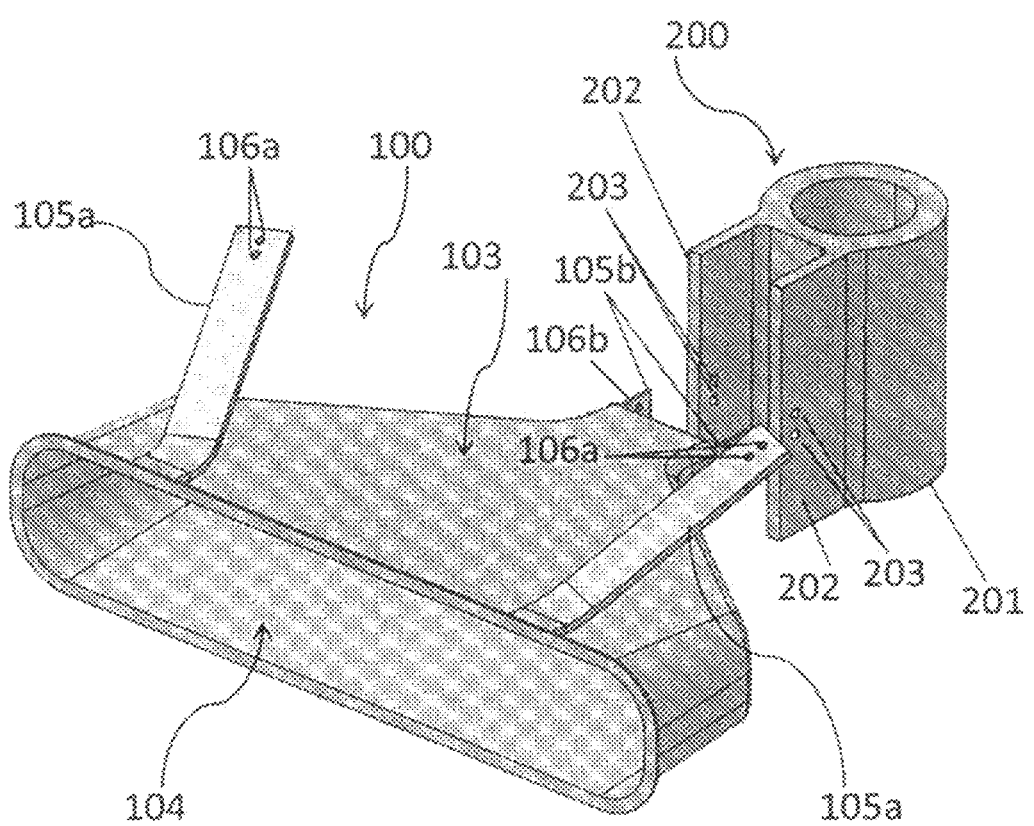
FIG. 2A is an exploded perspective view of the vehicle headlamp and component assembly according to a second embodiment of the present invention, depicting each of the headlamp assembly and an adjacent vehicular component to which the headlamp assembly is connectable.
Figure 2B:
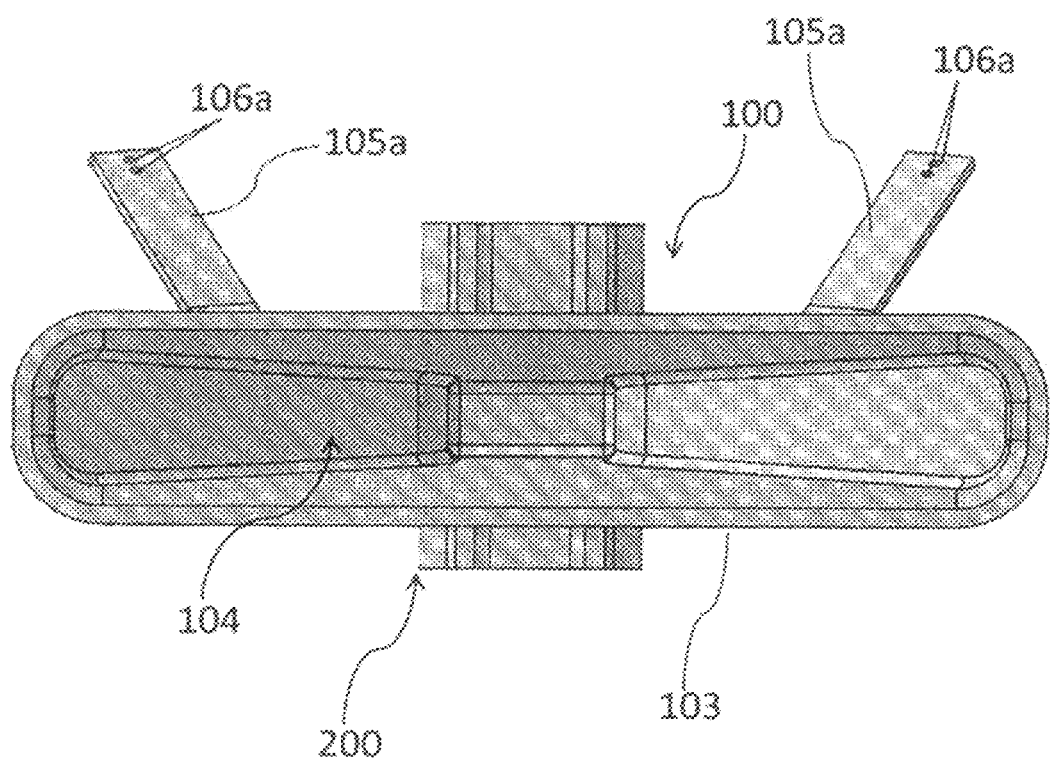
FIG. 2B is a frontal view of the vehicle headlamp and component assembly of FIG. 2A.
Figure 2C:
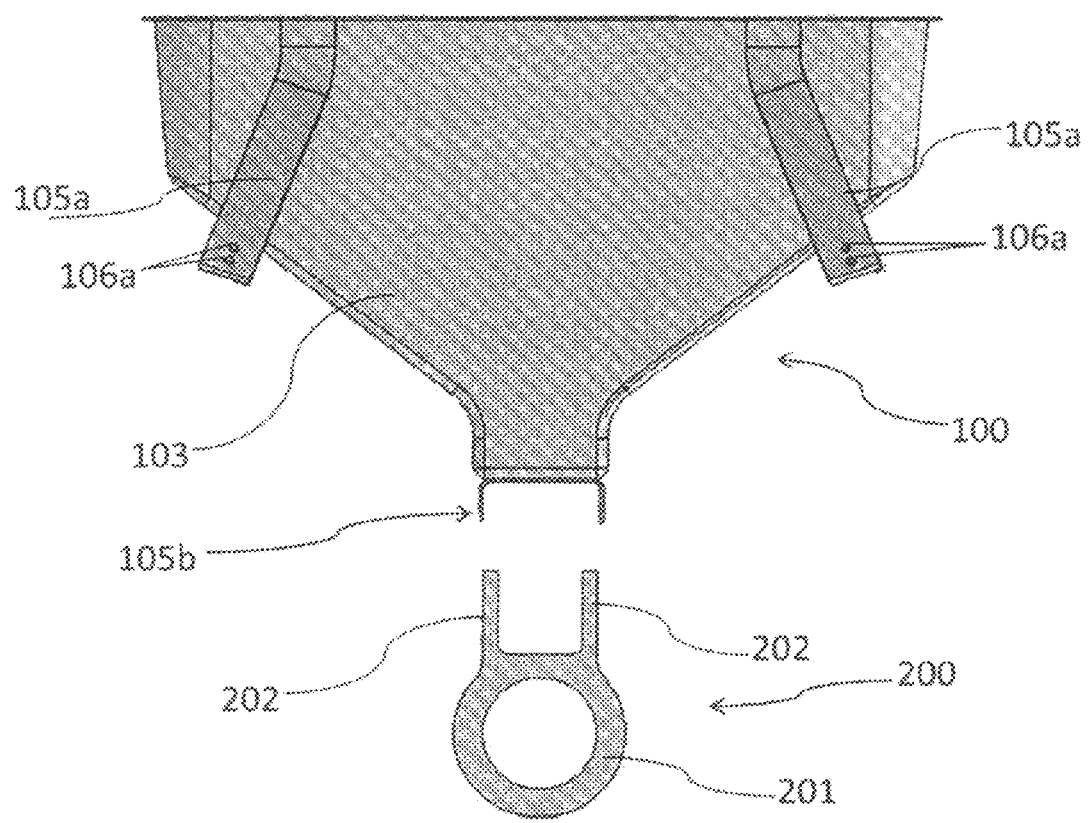
FIG. 2C is an exploded top plan-view of the vehicle headlamp and component assembly of FIG. 2A.

In the case of motorcycle, motor-scooter, and other such two-wheeled vehicle applications, and similar to the approach described above with respect to automobile applications, a headlamp assembly 100 includes one or more structural members 105a, 105b in the form of, respectively, fairing supports for connecting to one or more fairings of the motorcycle, motor-scooter, etc., and a bracket for connecting the headlamp assembly itself to a mounting structure 200 separately disposed on the motorcycle (FIGS. 2A through 2C). Of course, the headlamp assembly support structures may also, or alternatively, include structures adapted to connect to and support, without limitation but by way of example only, one or more of the instrument cluster, rear view mirrors, turn signals or other such features as may be practicable.

Still referring to FIGS. 2A through 2C, the headlamp assembly comprises a lens (not shown), a lamp housing 103 cooperating with the lens to at least partially define a lamp chamber 104 interiorly thereof that is generally fluidly isolated from an ambient atmosphere outside the lamp chamber, and at least one lamp (not shown) provided in the lamp chamber Extending upwardly from the surface of housing 103 are a pair of fairing supports 105a to which one or more fairings may be secured with suitable fasteners, such as, for example, screws, bolts, etc., through openings 106a. Of course, the orientation and shape of the fairing supports 105a may be varied according to the particular vehicle in connection with which the present invention is utilized.

Extending rearwardly from the housing 103, the bracket 105b will be seen to comprise a generally U-shaped bracket structure the opposite sides of which include openings 106b. Bracket 105 is dimensioned so that the opposite sides thereof are receivable over the mounting projections 202 which extend outwardly from the cylindrical sleeve 201 of mounting structure 200. Openings 203 in these mounting projections 202 are positioned and dimensioned to be aligned with openings 106b when bracket 105 is fully seated on mounting projections 202, with fasteners such as, for instance, screws, bolts, etc. (not shown) being receivable through these openings 106b, 203 to securely connect the headlamp assembly 100 to mounting structure 200 (the cylindrical sleeve 201 of which, in the exemplary embodiment, either constitutes the vehicle's head-tube or is disposed thereon or otherwise connected thereto).

Both a fairing and a headlamp assembly such as described above in relation to FIGS. 2A through 2C may be carried by or mounted to an existing thixoformed magnesium fairing support bracket or structure of the type employed by the Buell Motorcycle Company. Once again, in such an application, the headlamp may be a separate, stand-alone, bolt-on component. In other words, the headlamp housing may be integrated into such a motorcycle fairing support bracket, may be formed with such a motorcycle fairing support structure as a single unitary piece, or may be carried by such a motorcycle fairing support structure.

It will be appreciated that the headlamp assemblies of any of the foregoing embodiments may be configured for one or more lamps, according to the particular application, even though the exemplary embodiments depict individual headlamp assemblies configured only for single lamps. Where multiple lamps are required, the assembly may be monolithic or unitary, and each lamp housing may be directly adjacent the other or separated by an intermediate structure.

The construction of the present invention can simplify the overall design and manufacture of a vehicle, providing a more compact and lighter weight assembly and likely yielding a reduction in the overall cost (i.e., due primarily to the reduction in the number of required components, fasteners, assembly steps and, furthermore, manufacturing tooling required to produce said components).

As is the case in the automotive application described above, the number of components may thus be significantly reduced, the overall strength of the system may be increased, the fit and finish between the fairing and the headlamp may be significantly enhanced—due to lower tolerance stack-ups—and cost and mass are likely to be reduced as well due to a lower component count and fewer tools, fasteners, and assembly steps required to build the system.

In respect of any of the foregoing embodiments of the present invention, as well as other embodiments, but with reference to the embodiment of FIGS. 1A through 1H as representative, a bonding agent may be disposed between the lens 2 and the lamp housing 3 in a position to adhere the lens to the lamp housing. The bonding agent may also include a sealant to seal the lens to the lamp housing. The bonding agent may include adhesives/sealants such as butyl and silicone based sealants, by way of non-limiting example. In other contemplated embodiments, the bonding agent may include other suitable adhesives and/or sealants known in the art. It is also envisioned that the lens 2 may be mechanically connected to the lamp housing 3, in which case sealing may be accomplished via a gasket or other sealing device interposed between the lens and lamp housing.

Referring to the embodiments of each of FIGS. 1A through 2C, the lamp housings 1, 1', 100 thereof, including the one or more structural members 5a, 5b, 5a', 5b', 105a, 105b, may be formed as a single unitary (i.e., monolithic) metal piece, such as by a metal injection molding process, including, without limitation, thixoforming.

In thixoforming, a sub-technique of metal injection molding, ground, shaven, pelletized and/or other forms of magnesium or magnesium alloys are heated in a uniform semi-solid, thixotropic state; the material is then injected into a mold that is quite similar in design, scope and capability to those employed for plastic injection molding. The resulting magnesium injection-molded component is then removed from the die and trimmed as required.

Thixoforming thus encompasses the attributes and design flexibility associated with plastic injection molding yet, with the significant enhancement that magnesium, a structural grade metal, is used. Thus, not only can the use of thixoformed magnesium address the thermal energy dissipation requirements of high powered LED lamps, the structural attributes of magnesium can be utilized to great advantage in a novel, structural approach for multiple vehicular lighting applications.

In metal injection molding—or "MIM"—diverse metals can be blended with a plastic carrier and effectively molded as conventional plastic injection molded components, followed by secondary processes ultimately yielding a fully metallic part. Generally speaking, the MIM process begins with the atomization of molten metal to form metal powders. The metal powder is subsequently mixed with thermoplastic binders to produce a homogenous feedstock (approximately 60 volume % metal powder and 40 volume % binders). The feedstock is placed into an injection molder and molded at relatively low temperatures and pressures in conventional plastic injection molding machines to form a desired part. After injection molding, the binder is removed from the part by a process called "debinding." After debinding, the part is sintered at high temperatures, up to 2300 degrees F. (1260 degrees C.), under a dry $H_2$ or inert gas atmosphere, to form a high-density metal part. In MIM, the complex shape of the molded part is retained throughout the process, so close tolerances can be achieved, and scrap is eliminated or significantly reduced as machining of the part after sintering is usually unnecessary.

Alternatively, and with reference being had to the embodiment of FIGS. 1A through 1H, and FIGS. 1C, 1D, 1G and 1H in particular, each lamp housing 3, 3' may comprise two or more components that are interconnected as a unit. According to the exemplary embodiment, each lamp housing 3, 3' more particularly comprises an optical module/lamp sub-assembly 10, 10' that is removably receivable in a correspondingly-shaped opening provided in, and is mountable to, the lamp housing 3, 3' in sealed relation therewith (such as via the employment of seals, gaskets, O-rings, gimps, or other conventional sealing means. A weather-tight seal may be achieved by incorporating a suitable sealing mechanism between the optical module/lamp sub-assembly and the headlamp housing, such as a compliant membrane, gaskets, seals, O-rings and other commonly employed sealing methods, utilized within the automotive trade.

Each such sub-assembly 10, 10' carries with it the one or more lamps (e.g., LEDs) for the headlamp assembly 1, 1'. Accordingly, when the sub-assembly 10, 10' is mounted to the lamp housing 3, 3', the one or more lamps (e.g., LEDs) will be disposed in the lamp chamber at least partially defined by the lens 2, 2' and lamp housing 3, 3'.

Several alternative embodiments of the optical module/lamp sub-assembly 10, 10' are described further hereinbelow. These embodiments are modified from those lamp assemblies further described in U.S. Provisional Application Ser. No. 61/275,702, filed 3 Jun. 2009, as well as PCT Application PCT/US10/37260, filed 3 Jun. 2010, the disclosures of which applications are incorporated herein by reference in their entireties.

Whether formed as a monolithic component or as a unitary assembly, the lamp housing may be formed from one or more suitable materials such as, for example, stainless steel, low alloy steel, tool steel, titanium, cobalt, copper, magnetic metal, hardmetal, refractory metal, ceramic, magnesium, aluminum, and aluminum/magnesium alloy. The use of magnesium for the headlamp housing/fairing support structure may also benefit from inherent dampening characteristics of magnesium, which may provide vibration dampening for both the headlamp and the fairing system, thereby reducing overall vehicle vibration, as well as headlamp flutter.

Referring now to FIGS. 3A through 5C, in exemplary embodiments thereof the optional lamp sub-assembly 10, 10', 10" comprises a housing 11, 11', 11" in the form of an integral metal part, and at least one lamp 12, 12', 12". The housing defines a heat sink exposed to the ambient atmosphere outside the lamp chamber (e.g., 4 in the embodiment of FIGS. 1A through 1H), such that heat from the at least one lamp 12, 12', 12" is transmitted to the ambient atmosphere. Unless specified otherwise, the several embodiments of the lamp sub-assembly described here-below are identical in all material respects.

The at least one lamp sub-assembly 10, 10', 10" may optionally comprise one or more reflector portions 13, 13', 13". In conventional fashion, such one or more reflector portions 13, 13', 13" may be positioned and configured to reflect light emitted by the at least one lamp 12, 12', 12" forward toward the lens of the lamp housing (not shown in FIGS. 3A through 5C). The one or more reflector portions 13, 13', 13" may, to this end, include a polished surface. Rather than comprising separate elements, it is alternatively contemplated that the one or more reflector portions may be formed on or by a surface of the housing itself, being disposed in a position to reflect light emitted by the lamp forward to the lens, such as shown by the reflector portions 13, 13" in the embodiment of FIGS. 3A through 3C and FIGS. 5A through 5C, respectively. Of course, it is contemplated that a lamp sub-assembly 10, 10', 10" according to any of the embodiments described herein may or may not include one or more reflector portions, as desired.

Each at least one lamp 12, 12', 12" comprises at least one light source, which may take the form of one or more LEDs. The LEDs may be connected to one or more circuit boards 14, 14', 14", each including current paths connected to leads of the one or more LEDs and connectable to a source of electrical power (not depicted) that is operative to power the one or more LEDs. The circuit board(s) 14, 14', 14" may be mounted in the interior of housing 11, 11', 11".

With particular reference to the embodiments of FIGS. 3A through 3C and FIGS. 5A through 5C, the at least one lamp 12, 12', 12" may, optionally and according to user preference, further include one or more of a light pipe 15, 15", reflector optics 16", and/or total internal refraction optics 17".

The housing 11, 11', 11" of each embodiment may optionally define a heat sink exposed to the ambient atmosphere outside the lamp chamber such that heat from each at least one lamp (e.g., LED) is transmitted to the ambient atmosphere.

With reference being had to the particular embodiments of FIGS. 3A through 3C, the heat sink defined by housing 11 may, as shown, further include radiating elements, such as the exemplary fins 18a that are exposed to the ambient atmosphere outside the lamp chamber such that heat from the one or more lamps (e.g., LEDs) 12 is transferred to the ambient atmosphere through the fins 18a. These radiating elements may, alternatively or additionally, comprise pins 18b" (such as shown in the embodiment of FIGS. 5A through 5C), having any number of geometries and orientations as desired to ensure the sufficient dissipation of heat.

Figure 4B:
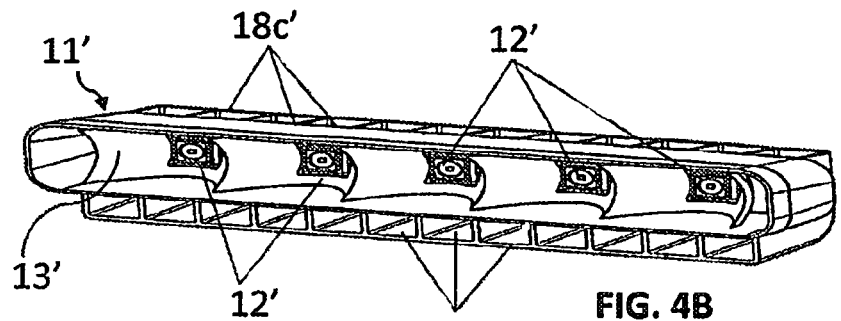
FIGS. 4B and 4C are, respectively, frontal and rear perspective views of the lamp sub-assembly according to the embodiment of FIG. 4A.
Figure 4C:
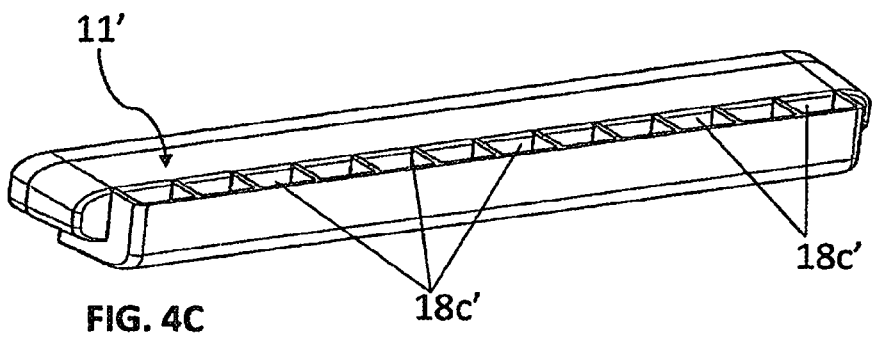
Figure 4A:
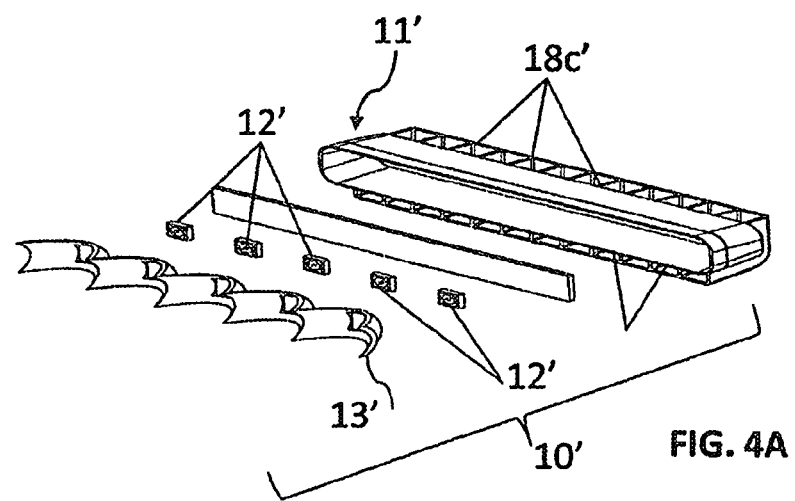
FIG. 4A is an exploded perspective view of a lamp sub-assembly according to a second embodiment of the present invention.

Turning now to the embodiments of FIGS. 4A through 4C, the heat sink defined by housing 11' may be seen to optionally comprise one or more ducts 18c'. These ducts 18c' are essentially channels which open at opposite ends to communicate with the ambient atmosphere outside of the lamp chamber, and which are shaped and positioned to promote passive convective cooling by using thermal load to generate a chimney effect; that is, convective cooling via a convective flow generated through the thermal output of the LED and channeled via the defined thermal channel and/or ducts.

While the housing per se defines a heat sink, it will be appreciated from the embodiment of FIGS. 3A through 5C that the heat sink defined by the housing 11, 11', 11" may further optionally comprise any one or more of the foregoing additional radiating elements, such as fins 18a and/or pins 18b", and/or ducts 18c' as also described heretofore.

In the embodiment of FIGS. 4A through 4C, the housing 11' is formed to integrally include a plurality of such ducts 18c'. Alternatively, ducts 18c' may be formed in a separate element defining a baffle that is secured to the housing 11'.

The sub-assembly of the foregoing embodiments may comprise an integral metal part formed from one or more materials such as, by way of non-limiting example, stainless steel, low alloy steel, tool steel, titanium, cobalt, copper, magnetic metal, hard-metal, refractory metal, ceramic, magnesium, aluminum, and/or magnesium/aluminum alloy. Preferably, though not necessarily, the sub-assembly housing is formed as a single, unitary—or monolithic—metal part, such as, for instance, by MIM, including the sub-technique of thixoforming, or other conventional metal forming processes.

The benefits associated with the optical module/lamp sub-assembly may, thereby, also be incorporated onto plastic lamp housings, whereby similar replacement, servicing and cost reduction attributes may also be realized. A further application of the lamp sub-assembly is contemplated for incorporation and combination with other housing materials, such as plastics, reinforced plastics, composites (e.g., carbon-fiber, fiberglass, etc.), metal stampings, and any other material suitable for the construction of the lamp housing.

For instance, a given optical module may thus be shared amongst various vehicles and headlamp systems, thereby resulting in substantive reductions in development as well as manufacturing costs, in addition to the previously mentioned assembly and servicing advantages.

This approach would prove advantageous for lightweight vehicle structures employing carbon-fiber construction in the areas encompassing a vehicle lighting system, not only the forward lighting but also any other vehicular lighting function (e.g., tail lamps, turn signals, daytime running lights, marker lamps, etc.).

As such materials exhibit inherently poor thermal conductivity, the incorporation of the optical module resolves the issue of providing a proper structural architecture for the optical systems (i.e., incorporating the fixing and positioning systems on a robust structure), as well as an effective thermal transfer medium for any thermal loads, which may require heat dissipation for effective lamp operation, both in terms of function, longevity and reliability.

Such attributes are of particular importance in LED-driven lighting applications, particularly high-powered LEDs, as their thermal output must be constantly dissipated in order to insure that the LEDs do not exceed specified operating temperature parameters. Failure to adequately cool the LEDs would result in premature, irreversible LED performance degradation and/or outright LED failure.

A further benefit of lamp sub-assembly embodiment is the ability to utilize any given lamp sub-assembly on multiple vehicles, which can thus utilize the same optical system, yet adapted to different headlamp configurations, whether on similar vehicles or entirely different models, types, and even brands/makes.

Therefore, the substantial cost associated with the high-powered LED optical systems may be effectively amortized amongst multiple applications, rather than on a small number of applications thereby significantly reducing costs.

The lamp sub-assembly embodiment may be utilized in any type of lighting configuration, irrespective of the construction method and material of the adjacent material associated with the lamp housing portion of the lamp (e.g., metal, plastic, composites, etc.).

And while the employment of LED lighting is exemplified herein, the present invention is equally applicable to other types of vehicle lighting systems, including, without limitation, tungsten, halogen, HID, etc.

The vehicle structural headlamp assembly of the present invention may also optionally incorporate features such as breakaway zones or elements aimed at facilitating compliance with frontal impact as well as pedestrian protection regulations. The inventive assembly can thus be replaced as a single item in the event of a collision or other event requiring either repair or replacement.

Further repairability may also optionally be provided by making the lens(es) of the lamp housing(s) removable so as to enable their singular replacement in case of limited damage, thus preserving the balance of the product for further use and thus avoiding the need to replace an entire assembly due to breakage/failure of a vulnerable component.

Headlamp beam aiming adjustment devices may be incorporated partially or entirely within the structural housing of the assembly. Such adjustment devices may be of any suitable type known in the art.

Given the trend toward larger, as well as more complex headlamp design, alternative headlamp aiming structures are also envisioned. While conventional aiming approaches currently in use within the trade will readily translate from current practice to a structural headlamp assembly of the present invention, further innovation aimed at addressing the unique requirements associated with modern headlamp designs are proposed. Rather than using conventional, purely internal housing headlamp aiming/adjustment arrangements, a simplified, hybrid external/internal aiming configuration may be provided.

Headlamp aiming components, which are required to effectively adjust the aim of a headlamp's beam per applicable laws and manufacturers' standards, can optionally be carried in the removable lamp sub-assembly, rather than being integral to the headlamp housing. This approach further simplifies the design, manufacturing, build and servicing of such vehicle headlamps. In such an approach, exemplified in the embodiment of FIGS. 1A through 1H, movement between the adjustable lamp sub-assembly 10 relative to the lamp housing 3, 3' is effected by the provision of an aiming mechanism (such as, for instance, the simple adjustment screws 19 shown) whereby the lamp sub-assembly 10 is moveable in multiple axes relative to a back-plate 3a, 3a' on which the lamp sub-assembly is mounted to the lamp housing 3, 3' in weather-tight sealing relation via means such as compliant gaskets, bellows, gimps and/or any other conventional sealing and weatherproofing means.

By the foregoing constructions, the present invention permits the removal and reuse of expensive components that are still in serviceable condition, whenever structural damage to the housing forces its removal and/or replacement, and further to permit the removal, service and replacement of specific components without the need to disassemble the structural elements of the headlamp assembly. In so doing, the ease of repair or replacement, as well as the costs associated with said activities, are substantially reduced, thereby decreasing repair cost exposure to manufacturers, relevant component/systems suppliers (i.e., during the vehicle's warranty period) and vehicle owners/operators (i.e., when the vehicle's warranty protection expires) alike.

Incorporating structural capabilities within a headlamp system enables the substantial streamlining and simplification of a vehicle's front-end structure design and construction, resulting in cost reductions, lower overall mass, as well as increased usable space within a given vehicle's packaging volume.

Furthermore, a headlamp system according to the present invention transforms the headlamp from an ancillary, bolt-on set of components to encompass a structural role, whereby structural loads are directed and addressed by the headlamp housing itself rather than by the traditional support structures.

Another attribute of the structural headlamp approach of the present invention is the ability to eliminate secondary support brackets for vehicle fascias, fenders and the like as, in current design practice, all such members require various locating and fixturing features given that existing, conventional headlamp designs are not capable of supporting the loads of adjacent components, such as fenders, fascias, grilles, trim and the like. In contrast, a structural headlamp can readily accept the loads associated with the support and location requirements of, for example, vehicle fenders and bumper fascias, thus eliminating additional components and hence reducing cost, weight and assembly complexity.

A further, significant benefit associated with the present invention relates to the issue of vehicle fit-and-finish. Current vehicle build methodology relies on various brackets and support elements to locate and fixture bumper fascias, fenders and the like. This entails considerable stack-up of manufacturing and build tolerances, which negatively affect the build accuracy of the vehicle and thus introduces significant additional costs related to the means and steps required to control said tolerances. On the other hand, the ability to directly mount and locate such elements directly to the headlamps entails a significant reduction in the build complexity along with a major improvement of build accuracy through the elimination of multiple component build and assembly tolerance stack-ups. Thus, the present invention provides potential to further reduce cost and mass while improving fit-and-finish as well as overall quality and vehicle performance via smaller, more consistent gaps as well as more robust, better located components through the elimination of secondary brackets and the like.

The foregoing description of the exemplary embodiment of the invention has been presented for purposes of illustration and description. It is not intended to be exhaustive of, or to limit, the invention to the precise form disclosed, and modification and variations are possible in light of the above teachings or may be acquired from practice of the invention. The embodiment shown are described in order to explain the principles of the invention and its practical application to enable one skilled in the art to utilize the invention in various embodiments and with various modifications as are suited to the particular application contemplated. Accordingly, all such modifications and embodiments are intended to be included within the scope of the invention. Other substitutions, modifications, changes and omissions may be made in the design, operating conditions, and arrangement of the exemplary embodiments without departing from the spirit of the present invention.

The invention in which an exclusive property or privilege is claimed is defined as follows:

1. A vehicle headlamp assembly, comprising:
   a lens;
   a lamp housing cooperating with the lens to at least partially define a lamp chamber that is generally fluidly isolated from an ambient atmosphere outside the lamp chamber;
   at least one lamp provided in the lamp chamber; and
   wherein the lamp housing comprises at least one structural member outside the lamp chamber, the at least one structural member configured to connect to and bear structural loads applied by one or more adjacent components of a vehicle in which the vehicle headlamp assembly is installed.

2. The vehicle headlamp assembly as defined in claim 1, wherein the at least one structural member of the lamp housing is configured to connect to and bear structural loads applied by one or more vehicle components selected from the group consisting of an inner fender support, a radiator support/module, a vehicle structural member, a fender, a shield, a battery box, an electronic control module, and a reinforcing structure.

3. The vehicle headlamp assembly as defined in claim 1, wherein the lamp housing defines a heat sink exposed to the ambient atmosphere outside the lamp chamber such that heat from the at least one lamp is transmitted to the ambient atmosphere.

4. The vehicle headlamp assembly as defined in claim 3, wherein further the heat sink defined by the lamp housing includes radiating elements that are exposed to the ambient atmosphere outside the lamp chamber such that heat from the lamp is transmitted to the ambient atmosphere through the radiating elements.

5. The vehicle headlamp assembly as defined in claim 4, wherein the radiating elements comprise fins that are exposed to the ambient atmosphere outside the lamp chamber such that heat from the lamp is transmitted to the ambient atmosphere by the fins.

6. The vehicle headlamp assembly as defined in claim 4, wherein the radiating elements comprise pins that are exposed to the ambient atmosphere outside the lamp chamber such that heat from the lamp is transmitted to the ambient atmosphere by the pins.

7. The vehicle headlamp assembly as defined in claim 1, wherein the at least one lamp comprises one or more LEDs.

8. The vehicle headlamp assembly as defined in claim 3, wherein further the heat sink defined by the lamp housing includes one or more ducts configured to promote passive convective cooling.

9. The vehicle headlamp assembly as defined in claim 8, wherein the one or more ducts are defined in a separate baffle that is secured to the lamp housing.

10. The vehicle headlamp assembly as defined in claim 1, wherein the lamp housing is formed as a single, unitary metal piece.

11. The vehicle headlamp assembly as defined in claim 10, wherein the lamp housing is a single, unitary, injection-molded metal piece.

12. The vehicle headlamp assembly as defined in claim 10, wherein the lamp housing is a single, unitary, thixoformed metal piece.

13. The vehicle headlamp assembly as defined in claim 1, wherein the lamp housing is formed from one or more materials selected from the group consisting of stainless steel, low alloy steel, tool steel, titanium, cobalt, copper, magnetic metal, hardmetal, refractory metal, ceramic, magnesium, aluminum, and magnesium/aluminum alloy.

14. The vehicle headlamp assembly as defined in claim 1, wherein the at least one lamp is carried on a separate lamp sub-assembly that is removably mountable to the lamp housing in sealed relation therewith.

15. The vehicle headlamp assembly as defined in claim 1, wherein the at least one structural member of the lamp housing is at least one motorcycle fairing support structure.

16. The vehicle headlamp assembly as defined in claim 15, wherein the lamp housing, including the at least one motorcycle fairing support structure, is formed as a single, unitary metal piece.

17. The vehicle headlamp assembly as defined in claim 15, wherein the at least one structural member of the lamp housing is a support structure for connecting the lamp housing to a headlamp mounting structure.

18. A vehicle headlamp and component assembly, comprising:
   a lens;

a lamp housing cooperating with the lens to at least partially define a lamp chamber that is generally fluidly isolated from an ambient atmosphere outside the lamp chamber;

at least one lamp provided in the lamp chamber; and at least one vehicle component connected to the lamp housing outside the lamp chamber, and wherein further the lamp housing is configured to bear structural loads applied by the at least one vehicle component.

19. The vehicle headlamp and component assembly as defined in claim 18, wherein the at least one vehicle component is one of an inner fender support, a radiator support/module, a vehicle structural member, a fender, a shield, a battery box, an electronic control module, and a reinforcing structure.

20. The vehicle headlamp and component assembly as defined in claim 18, wherein the lamp housing defines a heat sink exposed to the ambient atmosphere outside the lamp chamber such that heat from the at least one lamp is transmitted to the ambient atmosphere.

21. The vehicle headlamp and component assembly as defined in claim 20, wherein further the heat sink defined by the lamp housing includes radiating elements that are exposed to the ambient atmosphere outside the lamp chamber such that heat from the lamp is transmitted to the ambient atmosphere through the radiating elements.

22. The vehicle headlamp and component assembly as defined in claim 21, wherein the radiating elements comprise fins that are exposed to the ambient atmosphere outside the lamp chamber such that heat from the lamp is transmitted to the ambient atmosphere by the fins.

23. The vehicle headlamp and component assembly as defined in claim 21, wherein the radiating elements comprise pins that are exposed to the ambient atmosphere outside the lamp chamber such that heat from the lamp is transmitted to the ambient atmosphere by the pins.

24. The vehicle headlamp and component assembly as defined in claim 18, wherein the at least one lamp comprises one or more LEDs.

25. The vehicle headlamp and component assembly as defined in claim 20, wherein further the heat sink defined by the lamp housing includes one or more ducts configured to promote passive convective cooling.

26. The vehicle headlamp and component assembly as defined in claim 25, wherein the one or more ducts are defined in a separate baffle that is secured to the lamp housing.

27. The vehicle headlamp and component assembly as defined in claim 18, wherein the lamp housing is formed as a single, unitary metal piece.

28. The vehicle headlamp and component assembly as defined in claim 27, wherein the lamp housing is a single, unitary, injection-molded metal piece.

29. The vehicle headlamp and component assembly as defined in claim 27, wherein the lamp housing is a single, unitary, thixoformed metal piece.

30. The vehicle headlamp and component assembly as defined in claim 18, wherein the lamp housing is formed from one or more materials selected from the group consisting of stainless steel, low alloy steel, tool steel, titanium, cobalt, copper, magnetic metal, hardmetal, refractory metal, ceramic, magnesium, aluminum, and magnesium/aluminum alloy.

31. The vehicle headlamp and component assembly as defined in claim 18, wherein the at least one lamp is carried on a separate lamp sub-assembly that is removably mountable to the lamp housing in sealed relation therewith.

\* \* \* \* \*